UNITED STATES PATENT OFFICE 2,560,251

PROCESS FOR POLYMERIZATION OF N-VINYL COMPOUNDS

Donald Edward Sargent, Easton, Pa., assignor to General Aniline & Film Corporation, New York, N. Y., a corporation of Delaware No Drawing. Application February 3, 1945, Serial No. 576,154

9 Claims. (Cl. 260—88.3)

The present invention relates to an improved method of polymerizing N-vinyl compounds, such as N-vinyl pyrrole, or N-vinyl compounds containing the pyrrole ring, such as N-vinyl carbazole, N-vinyl tetrahydrocarbazole, N-vinyl propyl carbazole, N-vinyl indole, and N-vinyl naphthocarbazole which may be produced in the manner disclosed in U. S. P. No. 2,066,160 to Reppe et al. and may be polymerized in order to produce polymeric N-vinyl compounds.

When these N-vinyl compounds are polymerized, polymeric N-vinyl compounds are obtained which possess many unique and valuable properties. Polymeric N-vinyl compounds, such as polyvinyl carbazole, have been produced which are particularly valuable for use in the electrical field since these polymers, which possess high melting or softening points, also have very valuable electrical properties and are thus quite valuable as low loss electrical insulation materials in capacitors and elsewhere. Such polymeric N-vinyl compounds and methods of producing the same are disclosed in U. S. P. No. 2,072,465 to Reppe, Keyssner and Dorrer.

The present invention is particularly directed to improvements in the method of polymerizing N-vinyl compounds in which the monomeric N-vinyl compound is dissolved in a solvent and polymerization is effected by the action of an acid catalyst.

The present invention is based on the discovery that the solvent employed during the polymerization exerts a marked effect on the polymerization reaction and on the properties of the polymers produced.

It is therefore an object of the present invention to provide an improved process for polymerizing N-vinyl compounds in which the solvents employed for the polymerization are such that desirable types of polymers may readily be obtained in very good yields. Other and further objects will be apparent as the present description progresses.

In practicing the present invention, a monomeric N-vinyl compound is dissolved in a suitable solvent. The solvents which have been found to be particularly valuable for the polymerization of such compounds are di-halogenated aliphatic compounds containing not more than 4 carbon atoms in the chain. Those solvents in which the two halogen atoms are attached to the same or adjacent carbon atoms are particularly preferred. Among the solvents which have been found to be particularly valuable are methylene chloride, ethylene chloride, either symmetrical or unsymmetrical, 1,1- or 1,2-dichlorpropane, and to a lesser extent, 1,3-dichlorpropane and 2,3 dichlorbutane. The corresponding bromides have also been tried and are equally suitable solvents for the polymerization of N-vinyl compounds. The monomer dissolved in the solvent is then polymerized by adding to the solution a small amount of a suitable catalyst.

The catalyst employed for the reaction may advantageously be any practically anhydrous inorganic acid reacting condensing agent, as for example, tin tetrachloride, stannous chloride, aluminum chloride or sulfuric acid, zinc chloride, boron fluoride, boron hydrogen fluoride, silicon tetrachloride, mercury chloride, sodium bisulfate, potassium sulfate, alum, sulfuric acid, phosphoric acid, hydrochloric acid or hydrofluoric acid. In addition numerous organic acids, such as formic acid and the like, are operable as catalysts for effecting the polymerization in the present invention.

Boron trifluoride appears to be the most suitable catalyst for use in the polymerization reaction, and, therefore, the description of the present invention will largely be limited to the use of this material. However, it should be understood that the invention is not limited to this single catalyst since many of the advantages of the present invention are obtained with other acid catalysts. On addition of the catalyst, preferably with stirring or other agitation, the polymerization proceeds rapidly, and in a relatively short time, substantially all of the monomer has been polymerized. The degree of polymerization which is effected can readily be controlled by varying the amount of catalyst employed by controlling the temperature of polymerization. However, as will be pointed out in greater detail hereinafter, the process is operative through a wide range of temperatures and relative amounts of catalysts and solvents.

In practicing this invention it has been found that within relatively wide limits, the relative proportion of solvent to monomer which is employed, per se, exerts very little influence on the operability of the process and the exact proportions to be employed will, in general, be determined by practical and economic considerations, taking into account the other conditions, such as temperature used during the polymerization and the type of polymer desired as a product. Thus, at room temperatures, it is preferable to employ at least 1:1 ratio of solvent to monomer since at higher concentrations of the monomer, the solution, particularly after polymerization, is too viscous to be easily handled. On the other hand, it is generally desirable, at room temperatures, not to employ a ratio of solvent to monomer greater than 10:1 since otherwise the separation of the solvent from the polymer after polymerization, becomes unnecessarily expensive and any greater amounts of solvent are merely a load on the apparatus and have no useful purpose. Therefore, when the polymerization is to be effected at room temperatures, I prefer to employ a ratio of solvent to monomer of substantially 4 or 6:1. When such a ratio is employed, it is possible to control the temperature of polymerization by selecting a solvent having a boiling point only slightly above the temperature at which it is desired to conduct the polymerization so that in the event the temperature rises during polymerization a portion of the solvent will be vaporized and thus prevent a further temperature increase. At the same time, the amount of solvent vaporized during polymerization is not so great but that a fluid and readily handled solution of polymer and solvent will remain following the polymerization. When a relatively low temperature is to be employed during polymerization, in order to obtain a relatively high degree of polymerization, the amount of solvent which is employed should be slightly increased over the limits given above in order that the polymer which is produced will still be completely soluble, even at the low temperature employed. Ratios of solvent to monomer which will give a fluid solution of polymer and solvent following the polymerization and after possible vaporization of a portion of the solvent are therefore employed. The particular proportion to be employed can readily be determined once the other conditions of reaction have been set.

The selection of a particular solvent of the type specified above, which should be employed is likewise determined principally by practical and economic considerations and by considerations of the other conditions, particularly temperature, which are to be employed during the polymerization. In any event, it is necessary to employ a solvent which is liquid at the temperature at which the polymerization is effected. Thus, if the polymerization is to be effected at $-50°$ C., ethylene bromide would be unsuitable as a solvent since this material has a melting point of 9–10° C. On the other hand, if the polymerization is to be effected at a temperature of say $+50°$ C., methylene chloride preferably would not be used as the solvent since this material has a boiling point of 42° C. and its use would necessitate the use of pressure and pressure equipment. The selection of the solvent would also be controlled largely by its boiling point if it is desired to control the temperature of polymerization by vaporizing a portion of the solvent. If this means of temperature control is to be employed, the solvent employed would necessarily have a boiling point only slightly above the temperature selected for polymerization.

The temperature employed during the polymerization may be varied through a relatively wide range. However, the degree of polymerization which is obtained and consequently the properties of the polymer are substantially affected by the temperature at which the polymerization is conducted. In general, the lower the temperature at which the polymerization is effected, the higher the degree of polymerization which is obtained. Therefore, in practicing the present invention, the temperature employed will be determined largely by the type of polymer which it is desired to produce. It should be noted that in accordance with the present invention, it is possible to obtain a higher degree of polymerization at a relatively higher temperature when the solvents of the present invention are employed than when solvents of other types are used. In general, the degree of polymerization obtained in the resultant polymer, as illustrated by the K value of the polymer, varies inversely as the temperature. The relative degree of polymerization molecular weight of the polymeric product from the same monomeric product is evidenced by the characteristic viscosity of the polymer as defined by H. Fikentscher in Cellulose Chemie XIII, 58, 1932, this characteristic viscosity will hereinafter be referred to as "K value." Thus, at a temperature of approximately 20° C., while polymerizing vinyl carbazole with boron trifluoride, polyvinyl carbazole having a K value of 68 was obtained. Whereas, at a temperature of $-60°$ C., a polymer having a K value of 155 was obtained.

The amount of catalyst which is employed may also be varied through a relatively wide range. However, sufficient catalyst must be employed to assure substantially complete polymerization. On the other hand, if too large an amount of catalyst is employed, there is a tendency for less soluble and less easily moldable polymers to be produced and, therefore, unless such products are desired, the use of excessive amounts of catalyst must be avoided. It has been found that when using boron trifluoride as a catalyst, at room temperatures, a substantially complete polymerization is effected when $2.18 \times 10^{-5}$ mols of catalyst are employed for each mol of N-vinyl compound; while cross-linking and the production of relatively insoluble and infusible material does not begin until an amount of catalyst greater than $1.09 \times 10^{-4}$ mols of catalyst to 1 mol of N-vinyl compound is employed. It has also been found that at relatively lower temperatures, such as $-50°$ C. or lower, the reaction mixture becomes more tolerant of larger amounts of catalyst. The exact amount of catalyst which should be employed at any given temperature can readily be determined by experimentation. In general, any formation of a gel during polymerization indicates that too much catalyst is being employed. However, for particular purposes, it may be desired to employ large amounts of catalyst in order to obtain an insoluble and infusible material.

On completion of the polymerization, as evidenced by the fact that heat is no longer generated, the catalyst may be quenched by adding an alkaline substance to the reaction mixture, and the solvent removed from the polymer by any desired means, for instance, by distilling it off or by adding a nonsolvent for the polymer, such as methanol, to the reaction mixture to precipitate the polymer, followed by filtration and drying. Conveniently the quenching agent for the catalyst may be added in or along with the precipitating liquid.

The present invention will readily be understood from the following specific examples which are given for the purpose of illustrating the invention and not limiting the same:

*Example 1*

A mixture of 50 parts of N-vinyl carbazole and 134 parts of methylene chloride was charged into a reaction vessel and chilled to approximately $-69°$ C., care being taken to exclude atmospheric moisture. With rapid stirring 0.1 part of $BF_3 \cdot (C_2H_5)_2O$ was added. Within 30 seconds the temperature had risen to −60° C. and the reaction mass had "gelled" and was difficult to stir. After 5 minutes, 1 part of conc. aqueous ammonia was added to arrest any further catalytic action and the polymeric product was coagulated by pouring it into a rapidly agitated methanol bath. After this treatment, the product appeared as a white fibrous flocculent mass which was filtered off and dried. There was obtained by this method 41.8 parts (or 84%) of high grade poly-N-vinyl carbazole which has a K value of 155.

Under similar conditions, but with toluene as the reaction medium, a polymer having a K value of 67 was obtained.

*Example 2*

A mixture of 50 parts of N-vinyl carbazole and 400 parts of methylene chloride were placed in a reaction vessel provided with means of stirring. With an initial reaction temperature of 20° C., .005 part of $BF_3 \cdot (C_2H_5)_2O$ was added with rapid stirring. Within 30 seconds the temperature had risen to 37° C. and the viscosity of the solution had increased noticeably. After stirring for ½ hour, 20 parts of concentrated aqueous ammonia was added and the reaction mass was agitated with an excess of methanol to remove the methylene chloride, ammonia, water, residual catalyst, etc. After filtering and drying there resulted 47.5 parts (95%) of a white, flocculant poly-N-vinyl carbazole having a K value of 68.

Under similar conditions, but with carbon tetrachloride as the reaction medium, a polymer having a K value of 30 was obtained.

Under similar conditions, but with diethyl ether as the reaction medium, only a small amount of inferior grade poly-N-vinyl carbazole was obtained.

*Example 3*

Into a reaction vessel, equipped with an efficient stirrer, was charged 50 parts of monomeric N-vinyl carbazole and 300 parts of ethylene chloride. With rapid agitation 0.1 part of $BF_3 \cdot (C_2H_5)_2O$, dissolved in 10 parts of ethylene chloride, was then added. The temperature rose from an initial value of 20° C. to 32° C. After stirring for 5 minutes the reaction mass was treated with 2 parts of concentrated aqueous ammonia and poured into an excess of methanol. After washing in the methanol, whereupon the polymer was precipitated out, it was filtered off and dried. Forty-eight parts of poly-N-vinyl carbazole, having a K value of 52 was obtained.

Under similar conditions, the use of chloroform gave a very low quality polymer.

*Example 4*

A solution of 50 parts of N-vinyl carbazole in 300 parts of methylene chloride was placed in a reaction vessel equipped with a means of stirring. Under rapid agitation .016 part of $BF_3 \cdot (C_2H_5)_2O$ was added as the catalyst. The temperature immediately rose from 25° C. to 44° C. and a small amount of the methylene chloride boiled off. The solution became more viscous immediately after the catalyst was added and after 2 minutes it was a thick syrup. After 5 minutes, the reaction mass had "gelled" and was difficult to stir. One part of concentrated aqueous ammonia was then added and the whole was agitated with an excess of methanol to precipitate the polymer. A white, fibrous product resulted, suitable for molding, solvent-casting of films, etc. The K value was 68.

As shown in Example 1, it was necessary to reduce the temperature of the polymerizate to approximately −70° C. in order to prepare polymer of similar quality in toluene.

*Example 5*

A solution of 50 parts of N-vinyl carbazole in 150 parts of symmetrical tetrachlorethane was treated with 0.025 part of $BF_3 \cdot$dibutyl ether (dissolved in 0.475 part of dibutyl ether) with rapid agitation over a period of 9½ hours. At the end of this period, the reaction mass appeared as a viscous syrup. This was boiled up with an excess of methanol to precipitate and purify the polymer. After filtration and drying, there resulted 47 parts of high grade poly-N-vinyl carbazole suitable for the preparation of sheets, molded parts and the like.

Under similar conditions, a polymerization run made in $\beta,\beta'$-dichlorodiethylether gave a very low grade polymer that was not useful for molding, casting, etc.

I claim:

1. In the process of producing moldable polymeric N-vinyl pyrrole compounds wherein a monomeric N-vinyl pyrrole compound in solution in an inert organic solvent therefor is polymerized by subjecting the same, at a temperature below 40° C., to the action of an acid-reacting condensation catalyst in such a predetermined amount that the reaction mixture remains liquid, the improvement which comprises employing as said organic solvent for the said N-vinyl pyrrole compound an alkylene halide containing from 1 to 3 carbon atoms, and which is stable at the reaction condition.

2. A process as defined in claim 1, wherein the said N-vinyl pyrrole compound is N-vinyl carbazole.

3. A process as defined in claim 1, wherein said N-vinyl pyrrole compound is N-vinyl carbazole and wherein the said halogens in said alkylene halide are both on the same carbon atom.

4. A process as defined in claim 1, wherein said N-vinyl pyrrole compound is N-vinyl carbazole and wherein said alkylene halide contains from 2 to 3 carbon atoms and the said halogens are on adjacent carbon atoms.

5. In the process of producing moldable polymeric N-vinyl carbazole wherein N-vinyl carbazole in solution in an inert organic solvent therefor is polymerized by subjecting the same, at a temperature below 40° C., to the action of an acid-reacting condensation catalyst in such a predetermined amount that the reaction mixture remains liquid, the improvement which comprises employing methylene chloride as said organic solvent for said N-vinyl carbazole.

6. In the process of producing moldable polymeric N-vinyl carbazole wherein N-vinyl carbazole in solution in an inert organic solvent therefor is polymerized by subjecting the same, at a temperature below 40° C., to the action of an acid-reacting condensation catalyst in such a predetermined amount that the reaction mixture remains liquid, the improvement which comprises employing ethylene chloride as said organic solvent for said N-vinyl carbazole.

7. In the method of producing moldable polymeric N-vinyl carbazole wherein N-vinyl carbazole dissolved in an inert organic solvent therefor is polymerized by subjecting the same, at a temperature below 20° C., to the action of boron trifluoride in an amount of the order of $2.18 \times 10^{-5}$ mols of boron trifluoride per mol of said N-vinyl carbazole, the improvement which comprises employing as said organic solvent for said N-vinyl carbazole an alkylene halide containing from 1 to 3 carbon atoms which is stable at the reaction condition.

8. The method as defined in claim 7, wherein the alkylene halide is methylene chloride.

9. The method as defined in claim 7, wherein the alkylene halide is ethylene chloride.

DONALD EDWARD SARGENT.

REFERENCES CITED

The following references are of record in the file of this patent:

UNITED STATES PATENTS

| Number | Name | Date |
|---|---|---|
| 2,072,465 | Reppe | Mar. 2, 1937 |
| 2,231,905 | Hanford | Feb. 18, 1941 |

FOREIGN PATENTS

| Number | Country | Date |
|---|---|---|
| 500,211 | Great Britain | Feb. 6, 1939 |